Aug. 21, 1923.
J. SACHS
1,465,688
INCASED CIRCUIT CONNECTING AND CONTROLLING DEVICE
Filed Jan. 12, 1918
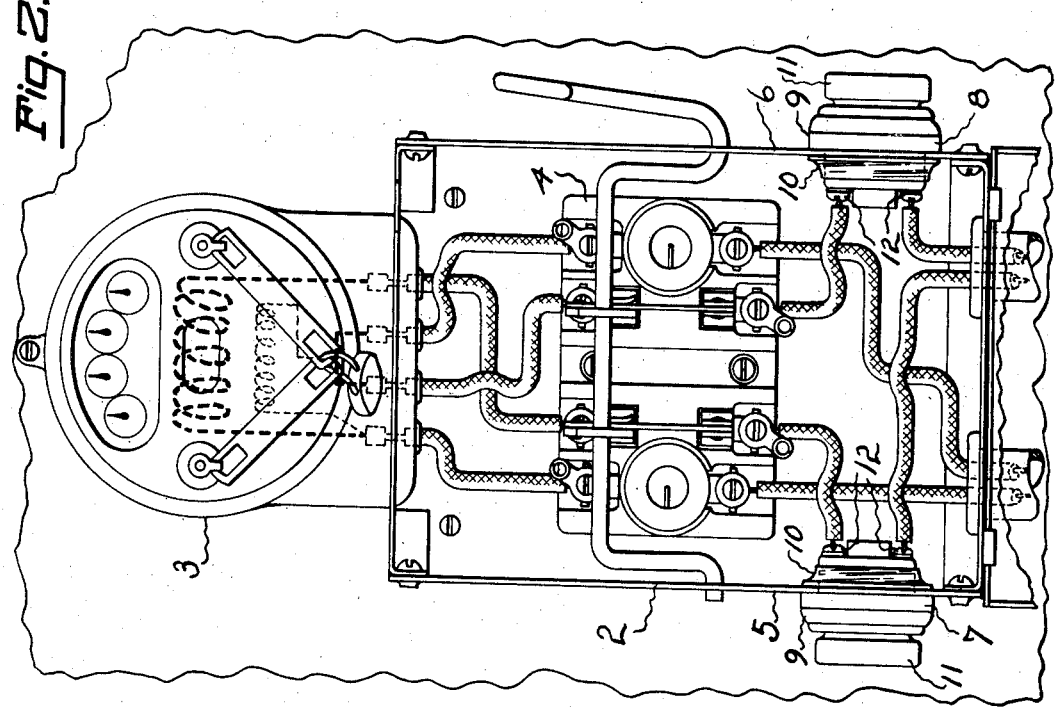
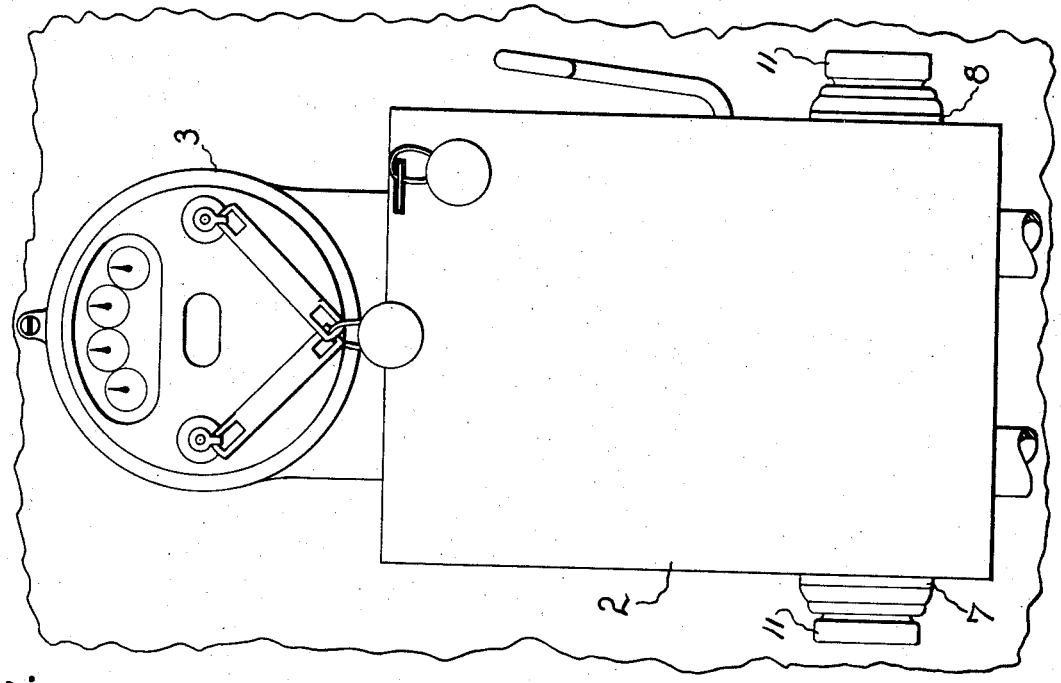

Patented Aug. 21, 1923.

1,465,688

UNITED STATES PATENT OFFICE.

JOSEPH SACHS, OF HARTFORD, CONNECTICUT.

INCASED CIRCUIT CONNECTING AND CONTROLLING DEVICE.

Application filed January 12, 1918. Serial No. 211,692.

*To all whom it may concern:*

Be it known that I, JOSEPH SACHS, a citizen of the United States, residing at Hartford, in the county of Hartford and State of Connecticut, have invented certain new and useful Improvements in Incased Circuit Connecting and Controlling Devices, of which the following is a specification.

This invention relates to incased circuit connecting and controlling devices and is of particular utility where such incased devices are used as a part of service or meter installations, and where it is desired to prevent access to the interior conductors and members. In such meter installations it is common to provide an electrical connecting and circuit controlling appliance by means of which the circuit to the meter and the connected load may be properly connected and controlled by manual operation as well as automatically by means of fuses. Such connecting and controlling devices have been incased in a suitable housing provided with means for its protective relation and placement in connection with the meter itself. The housing is usually sealed so that the devices inside of it are inaccessible except by breaking the seal, thus providing security against tampering and unauthorized manipulation or connection with the circuit ahead of the meter. Where the main fuses for the circuit are a part of the protectively housed device they are inaccessible and cannot be replaced except by breaking the seal which is not to be done except by authorized persons. In order to prevent the need for frequent renewal of the main fuses I have provided an arrangement in which auxiliary fuses are supplied, mounted on the casing, and on the load side of the meter in such a way that they may at all times be renewed by any one. I have also provided a casing or cabinet for the purpose above stated or for any analogous purpose and which in itself without any extraneous or additional parts, forms the support for fuse-receiving and connecting means, which support is so arranged that the fuse or fuses may be inserted therein or removed therefrom at any time and from the exterior of the casing and without unsealing or opening up the cabinet itself. In its application the invention is not limited to any particular arrangement of the connecting or circuit controlling devices inaccessibly mounted inside of the cabinet, and these may be of any character and connected in any way whether the cabinet be used in protective relation with a meter or not.

I also provide a compact fuse-receiving means adapted to be applied to and wholly supported on or in an opening in one of the walls of the protecting casing, so as to cover or close said opening against access therethrough to the parts within the casing but nevertheless provided with facilities for the renewal of fuses, as stated.

In the drawings forming part hereof I show a preferred form of the invention without limitation, however, to this exact disclosure.

Referring to said drawings:—

Fig. 1, is a front face view of a meter installation showing my improved device.

Fig. 2, is a similar view with the front or cover of the casing opened.

The numeral 2 denotes the casing or box in its entirety, made generally of sheet metal and having a back, side and end walls and a cover. Such a box is intended to be permanently secured by its back wall to a fixed support, as for example to the wall of a building adjacent the electrical service entrance thereto. This box in the particular form herein shown is protectively related to the meter 3 by the projection of the terminal chamber of the meter through one of the end walls into the interior of the box, although this is only one form of protective relation. In the casing suitably secured to the back wall thereof is an electrical circuit controlling appliance 4 provided with a handle extending through the side wall whereby the circuit can be opened and closed from the exterior and also provided with fuses or cutouts for the automatic control of the circuit.

In the particular construction shown in the drawings, the side wall part of the box or casing carries the externally accessible fuse-receiving means but there is no limitation in this particular as they may be otherwise carried as will later appear. The construction herein shown is arranged so that the fuse-receiving means referred to are mounted and held in the vertical side walls 5 and 6 of the casing 2. These side walls are provided with apertures or holes to receive the bodies 7 and 8 of the fuse-receiving means.

For the structure which constitutes the fuse-receiving means referred to I have found it possible to use a standard article already on the market and known as a sign receptacle, these receptacles being commonly used for supporting and connecting electric incandescent lamps in the familiar electric display signs. The particular kind of sign receptacle is unimportant, and for that matter instead of using the standard sign receptacle, I may use any other compact construction to provide the body and its contacting parts, which body can be suitably mechanically supported and secured to the casing and which will provide the fuse-receiving means referred to. The sign receptacle shown has an insulating body 9 with an enlarged head which fits against the outer surface of the box wall. The portion of the body below the head projects through the opening in the wall and to hold the body in place means such for instance as the screw flange 10 is used, whereby the sign receptacle is locked to and held securely mounted on the marginal part of the opening in the wall. The construction of such sign receptacles is so well-known, that it is unnecessary to go into details here any more than to say that the contact parts are of the Edison screw plug type, so that an ordinary lamp or as in this case a fusible screw plug, as 11, may be inserted therein. When mounted in the casing 2 it is entirely supported by said wall, that is to say, it is adequately secured in its permanent position by the means described without need of any auxiliary support. In such position it is in fact spaced forwardly from the fixed support or building wall on which the box is mounted and has no direct contact or connection thereto. The inside end of the sign receptacle or fuse-receiving means carries wire-connecting means such as 12 to which the terminals of the proper circuit wires may be connected. Preferably these wire-connecting means project into the interior of the box as shown. The general scheme of the circuit connections is shown in the drawing; the incoming circuit, or service conductors, first being connected to the controlling device 4, from there extending to the meter, back through the device 4 and then to the fuse-receiving means or sign receptacles 7 and 8, and thence out through an opening in the bottom wall.

Under some conditions it is desirable that these fuse-receiving means containing the externally accessible fuses be connected in this manner but such exact connection is not at all essential for the purpose of carrying on my invention, because the advantages obtained from the use of my fuse-receiving means mounted directly in or on a part of the casing provide many obvious convenient connections of the circuit relation. It is possible for example to convert a simple enclosed switch into a fused switch by merely applying the fuse-receiving means to openings in the box wall. Usually the arrangement will be to bring the incoming circuit to some form of circuit controlling and connection device sealably secured inside of the cabinet. From there the circuit may extend to the meter in any manner found most desirable and from the meter to the load or outgoing wires after the circuit has passed through one or more externally accessible fuse-receiving means. In the particular installation shown, which is a two-wire installation, I have provided two fuse-receiving means or sign receptacles, one for each leg of the circuit, but the number of these is wholly a matter of choice. It will be understood in any event that the insulating body of the fuse-receiving means occupies or obstructs the opening in the casing wall so as to prevent access through the same to the interior electrical parts, the wire-connecting means 12 being on one side of the closure and the part to be engaged by the removable fuse being on the other, thus constituting the device as a unitary closure structure.

To now understand just exactly how a device embodying my invention functions and operates in actual service after it has been arranged and connected practically as shown in Fig. 2 or in some other way within the purview of the invention, reference may now be had to Fig. 1. Here it will be seen that the screw plugs 11 are externally accessible and may be manipulated for removal or insertion or the substitution of others when blown, while all other electrical connection parts within the casing are sealed and inaccessible. The parts which are so sealed are those parts which are ahead of the meter which if accessible would permit of connection therewith and taking current from the circuit ahead of the meter. The fuse receiving means and their coacting fuse plugs 11 are connected to the meter and may, therefore, be accessible and manipulable without cheating the meter and yet permit the person on whose premises such an apparatus may be installed to renew these fuses when blown. While I have referred to fuses connected ahead of the meter and mounted or forming a part of the seal or protective circuit connecting and controlling device 4, it will be understood that when such fuses are used, they will be of larger size than the fuses 11, but it is not vital to the purposes of this invention whether there are fuses ahead of the meter or not. I also wish to state that while I have shown fuses as being of the screw plug type, the fuse receiving means may be constructed so as to take fuses of any other type.

I have thus far referred to arrangements similar to the structure shown in which there is a circuit connecting and controlling device mounted and sealed within the casing or housing, but I do not intend to imply that my invention is not equally available where there is no such device mounted within the casing; for instance the casing may be protectively related with a meter in a manner similar to that shown or in any other manner, and the incoming circuit wires may extend through the casing after entering it and directly to the meter, while the circuit wires from the meter may extend to the fuse reciving means carrying the externally accessible fuses and from there to the load.

What I claim is:

1. In apparatus of the kind described, a service meter, service and load conductors respectively leading to and from it, a controlling device connected in the circuit on the service side of the meter and means encasing and thereby protecting said device and the conductors which intervene between the same and the meter against unauthorized access, in combination with a body structurally independent of and physically removed from, said controlling device and formed for cooperation with an opening in a wall of said encasing means and wholly supported by said wall and externally accessible fuse-receiving means carried by said body and connected through said opening to one of the conductors in the box on the load side of the meter.

2. In apparatus of the kind described, a service meter, service and load conductors respectively leading to and from it, a circuit controlling device connected on the service side of the meter and means comprising a box for encasing and thereby protecting said device and said conductors adjacent the meter, said box having an opening serving as an exit for the load conductors, and another opening, in combination with a body structurally independent of and spaced from said controlling device wholly supported by a wall of said box and forming a closure for said last named opening, and externally accessible fuse-receiving means mounted on said body and connected through said opening in the load side of the circuit.

3. In apparatus of the kind described, a service meter, a controlling device, and an associated box adapted to be secured to a building wall and encasing said device and the service and load wires leading to and from the meter and provided with means whereby it may be sealed against unauthorized access, in combination with a separately made body forming a closure to an opening in a wall of said box, and a fuse-receiving means carried on the outer side of said body so as to be externally accessible for the renewal of fuses, said fuse-receiving means being provided with wire-connecting binding posts connected on the inside of the box with the conductor wires in the latter.

4. In apparatus of the kind described, a metal box enclosing and protecting conductor wires against unauthorized access and adapted to be secured to a fixed support and provided with an opening in one of its walls, an insulating body applied to and supported by said box wall independently of said fixed support and serving as a closure to said opening, said body carrying wire-connecting binding posts on its inner side adapted for connection to the protected wires within the box and having fuse-receiving contacts on its outer side, accessible from the exterior of the box.

5. In apparatus of the kind described, a box for enclosing circuit wires adapted to be secured to a building wall and provided with means whereby it may be sealed against unauthorized access and provided also with an opening in one of its walls, a separately formed closure body applied to and supported by said box wall independently of the building wall and serving as a closure to said opening, said body being provided with fuse contact terminals accessible from the exterior of the box and with wire connecting means on its inner side for connection with a wire located within the box, and a fastening means for securing said body on the box wall which is accessible only by opening the box.

6. In apparatus of the kind described, a box enclosing circuit wires, provided with means whereby it may be sealed or locked to protect said wires and provided also with an opening in one of its walls, in combination with a body applied to said box wall as a closure to the opening therein and provided with a flange member securing the same to the marginal portion of said wall so that it is supported entirely thereon and thereby, fuse-receiving means carried on the outer side of said body, accessible from the exterior of the box and connected through said opening to a protected wire located within the box.

7. The combination of a box for encasing and protecting circuit conductors having a back wall, side walls and a movable front wall or box cover and provided with an opening in one of its side walls, said opening being spaced from said back wall, a fuse-receiving means secured to and wholly supported by said side wall, and serving as a closure to said opening, said means comprising fuse contact terminals accessible from the exterior of the box and connected through said opening, with conductors within the box.

8. The combination of a box for enclosing electrical devices and conductor wires having an opening in one of its walls and a separately formed body structurally independent of any device within the box and mounted so as to project from the exterior of said wall without any other support, said body carrying wire-connecting means on its inner side for connection to a conductor located in the box and also carrying externally accessible fuse contact terminals on its outer side.

9. The combination of a box for enclosing electrical conductors against unauthorized access, having an opening in one of its walls, a body of insulating material inserted in and occupying said opening and means for securing the same in position on said wall, said body carrying externally accessible fuse contact terminals and also carrying wire-connection means adapted for connection to conductors within the box.

10. In apparatus of the kind described, a switch, conductor wires connected thereto, a switch box adapted for encasing and protecting said switch and conductor wires against unauthorized access, an opening in one of the box walls, means structurally separate from, and independent of the switch for closing said opening, adapted to be mounted on and wholly carried by said box wall, a fuse-receptacle carried on said closure means so as to be accessible from outside the box and means whereby said fuse-receptacle is connected to the protected wires within the box.

11. In apparatus of the kind described, a service meter, service and load conductor wires respectively leading to and from it, a switch connected in the circuit and main circuit fuses associated therewith, a box encasing said switch, main fuses and conductor wires and provided with means whereby it may be locked against unauthorized access, an externally accessible operating handle for the switch, one of the walls of said box having an opening therein, which, if unobstructed, would allow access to the service side of the circuit, in combination with a closure for said opening comprising a body carrying fuse contact terminals on its outer side and wire-connecting means on its inner side connected to the load side of the circuit, whereby customer's fuses may be connected into and removed from the circuit without opening the box.

In testimony whereof I affix my signature in the presence of two witnesses.

JOSEPH SACHS.

Witnesses:
L. L. MARKEL,
HEATH SUTHERLAND.